July 29, 1930. J. E. HOPKINS Re. 17,757
APPARATUS AND METHOD FOR RECOVERING PRECIOUS METALS
2 Sheets-Sheet 1
Original Filed June 21, 1926
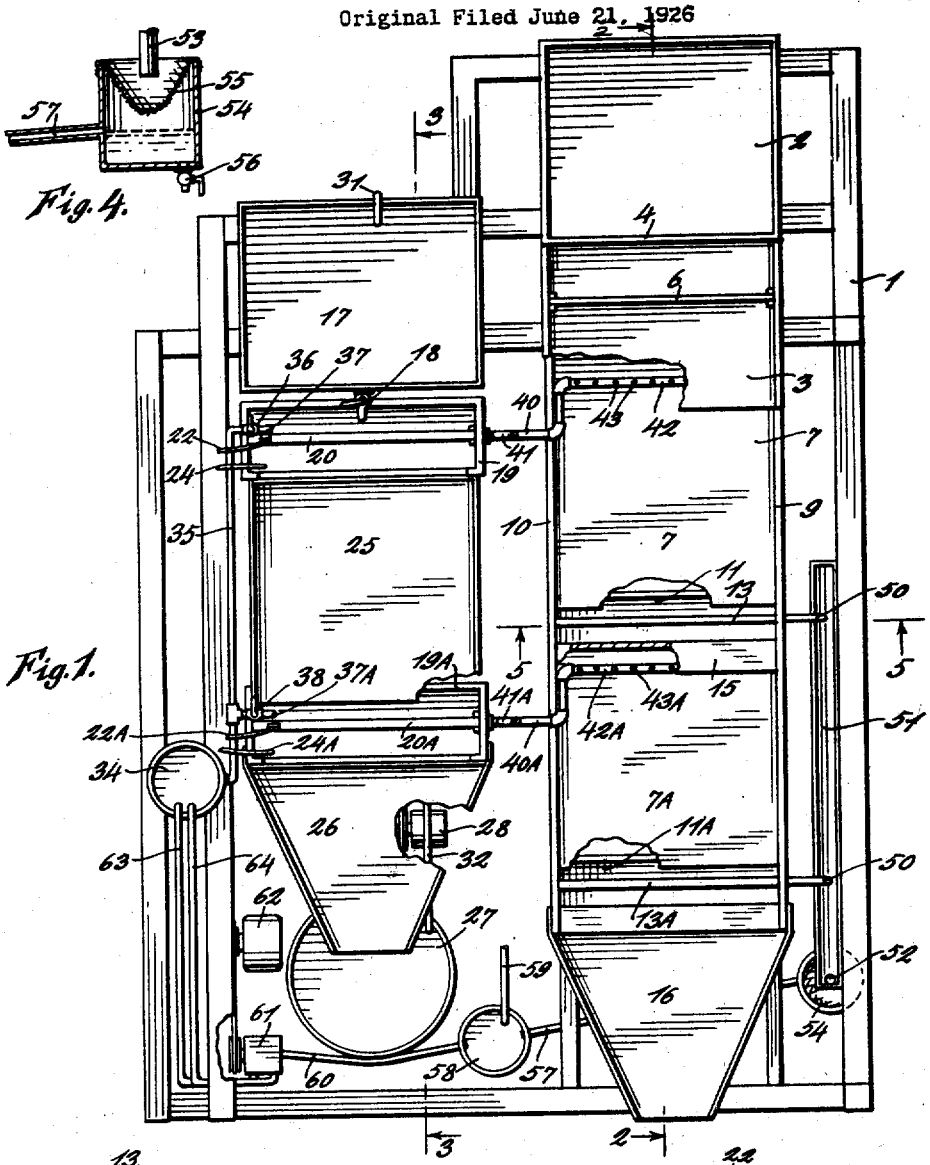
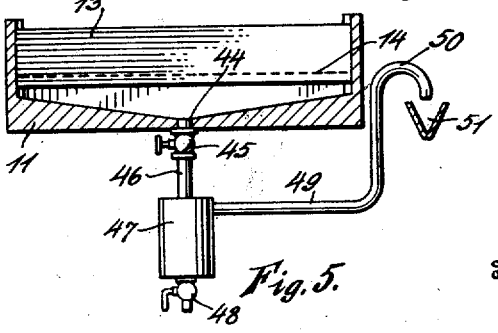
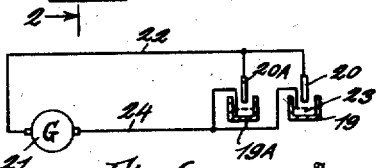
Inventor
James E. Hopkins.
By A. J. O'Brien
Attorney July 29, 1930. J. E. HOPKINS Re. 17,757
APPARATUS AND METHOD FOR RECOVERING PRECIOUS METALS
2 Sheets-Sheet 2
Original Filed June 21, 1926
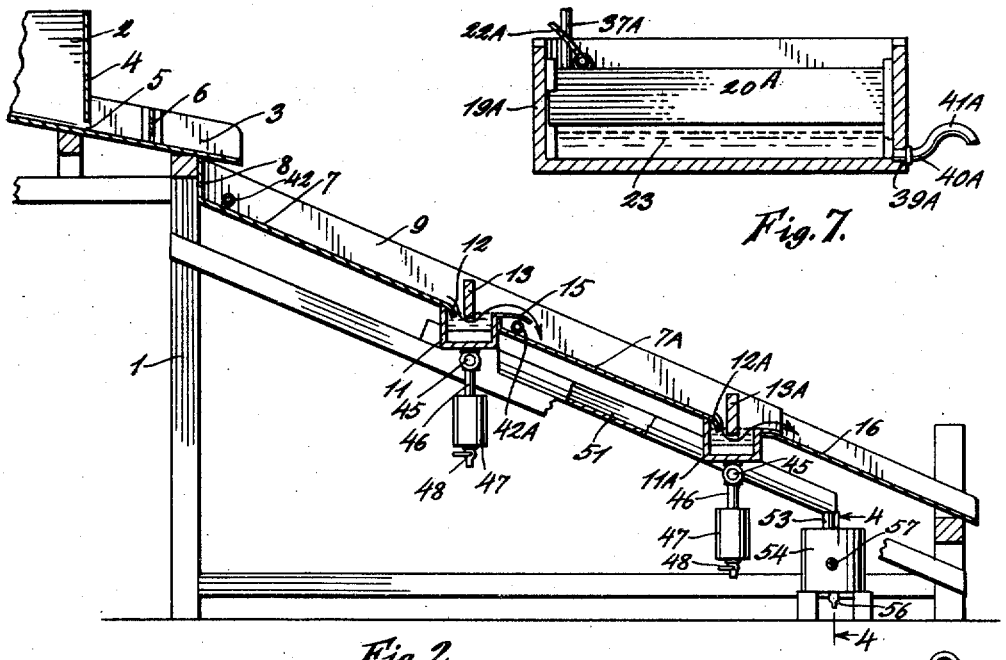
Fig. 7.
Fig. 2.
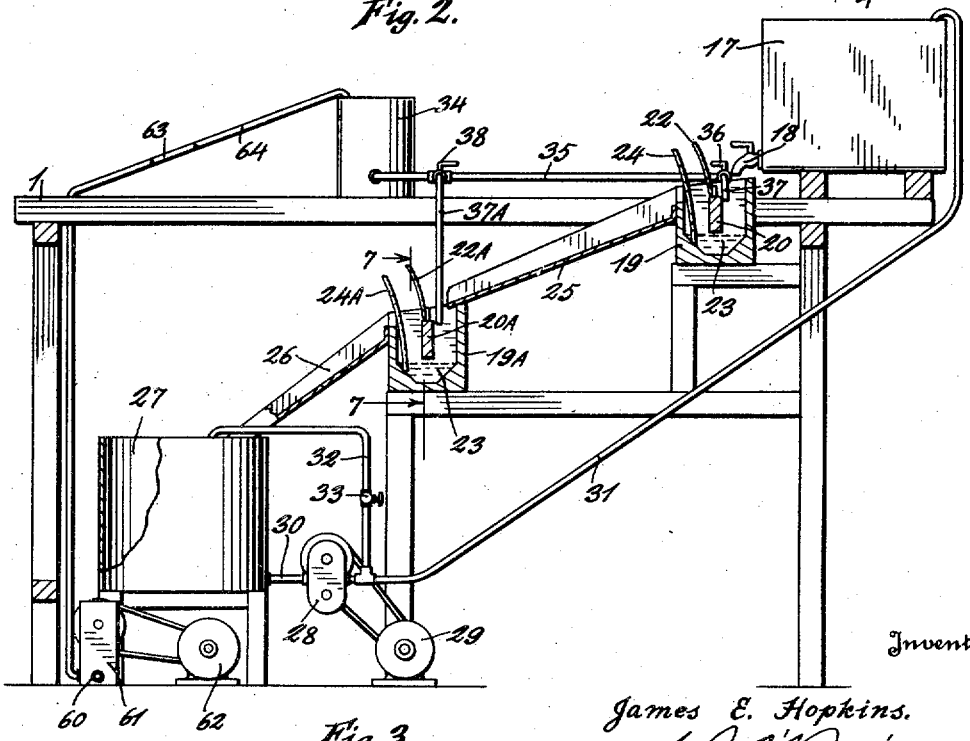
Fig. 3.
Inventor
James E. Hopkins.
By A. J. O'Brien
Attorney Reissued July 29, 1930 Re. 17,757

UNITED STATES PATENT OFFICE

JAMES E. HOPKINS, OF DENVER, COLORADO, ASSIGNOR, BY MESNE ASSIGNMENTS, TO THE NASCENT AMALGAM CORPORATION, OF DENVER, COLORADO, A CORPORATION OF COLORADO

APPARATUS AND METHOD FOR RECOVERING PRECIOUS METALS

Original No. 1,678,142, dated July 24, 1928, Serial No. 117,383, filed June 21, 1926. Application for reissue filed January 2, 1930. Serial No. 419,007.

This invention relates to improvements in apparatus and method for recovering gold and platinum values from auriferous and platiniferous materials and sands.

It is well known to those versed in this art that gold will quite readily form an amalgam, with mercury or quicksilver and it is equally well known that platinum will not form an amalgam.

It has, therefore, been possible to recover gold values by means which permit the gold to come into direct contact with mercury, but this has failed to save the platinum values which are often of greater value than the gold.

When sodium is added to quicksilver, it intensifies the action thereof and greatly increases its affinity for gold. The sodium amalgam also has an affinity for platinum so that if the latter comes into contact with it, it will be amalgamated. This is believed to be due to the fact that there is an affinity between the sodium and the platinum, which causes the sodium to form a coating on the platinum particles and, since there is a strong affinity between the mercury and the sodium, the sodium coated particles of platinum will combine with the mercury. It is evident that if a sodium amalgam containing platinum is subjected to some treatment that will remove the sodium the platinum will separate from the mercury. This is taken advantage of and the sodium platinum amalgam is subjected to the action of water which combines with the sodium, forming sodium hydroxide and hydrogen ($Na+H_2O=NaOH+H$).

It is an object of this invention to produce a machine for the recovery of gold and platinum values which shall be so constructed that it will continuously renew the sodium in the mercury so as to provide a continuous supply of sodium amalgam which is then delivered to the amalgamating device or separator. This production of sodium and nascent sodium amalgam is produced by electrolytic means in the manner to be presently described.

My invention can be most clearly described and will be most readily understood when reference is had to the accompanying drawings in which the preferred embodiment of an apparatus for practising the invention has been illustrated and in which:

Figure 1 is a top plan view of the combined amalgamator and sodium amalgam generator.

Figure 2 is a section taken on line 2—2, Figure 1.

Figure 3 is a section taken on line 3—3, Figure 1.

Figure 4 is a diametrical section of the mercury tank designated 54 in the drawing as taken on line 4—4, Figure 2.

Figure 5 is a section taken on line 5—5, Figure 1.

Figure 6 is a wiring diagram; and

Figure 7 is a longitudinal section through one of the electrolytic cells and is taken on line 7—7, Figure 3.

In the drawings the supporting framework has been designated as a whole by the numeral 1 as there appears to be no necessity for identifying all of the parts thereof. Supported by this framework is a receptacle or hopper 2 which contains the pulp to be treated, a chute 3 extends from one side of the hopper 2 and its bottom may be formed by an extension of the bottom of the hopper. The wall 4 of the hopper has its lower edge spaced from the bottom so as to provide a slot 5 through which the pulp may flow. An adjustable gate 6 serves to determine the rate at which the pulp flows from the lower end of the chute.

Located directly below the end of chute 3 is a recovery table preferably consisting of a copper plate 7 whose upper surface has been amalgamated if desired. The upper end of the plate 7 is bent upwardly in the manner indicated by numeral 8 so as to prevent leakage and its sides are secured to the side pieces 9 and 10. The lower edge of the plate 7 rests on the top of the upper wall of the trough 11 and is curved downwardly in the manner indicated at 12. A baffle bar 13 extends between the sides 9 and 10 directly over the center line of the trough 11 and serves to force the pulp to pass down under and against the sodium amalgam whose upper surface is indicated by line 14 in Figure 5.

After passing underneath the baffle bar 13, the pulp flows over the edge or apron 15 of the trough 11 and onto the plate 7A which is located directly below and thence underneath the baffle bar 13A from which it flows onto the chute 16. As many of these plates and troughs may be used as may be found to be necessary, but I have shown two as an example.

Supported on the framework 1 in parallel relation with the amalgamator which has been partially described above is an electrolytic device which serves to produce the sodium amalgam. This device will be best understood when reference is had to the section shown in Figure 3, and consists of a tank 17 which serves as a reservoir for a solution of sodium chloride. This tank has a faucet 18 which is located directly above the electrolytic cell 19. This cell has a carbon anode 20 which extends longitudinally thereof and is connected with the positive pole of a direct current source 21 (Figure 6) by means of a wire 22. The cell contains a quantity of mercury 23 which is connected to the negative pole of the current supply by means of the conductor 24. A launder 25 is secured at its upper end to the lower wall of the cell 19 and serves to carry the brine from cell 19 to a similar cell 19A that is located at a lower level. It is the intention to have the same number of electrolytic cells as there are plates 7 although it is possible to have a single cell for serving a plurality of plates. The lower cell has been designated by 19A and the other elements are indicated by the same reference numerals as the corresponding elements in the upper cell but to which the letter A has been added. From the lower cell 19A a launder 26 extends to the reservoir 27. A pump 28 which is operated from power derived from the motor 29 has its intake port connected with the reservoir 27 by means of a pipe 30 and its outlet port connected with the tank 17 by means of a pipe 31. A branch pipe 32 extends from the pipe 31 to the reservoir 27 and is controlled by the valve 33. The object of the by-pass 32 is to permit the delivery to tank 17 to be regulated so that the level of the brine will remain substantially constant.

A tank 34 is supported on the framework 1 at a point above the level of the mercury in the uppermost cell 19 and serves as a reservoir or supply for the mercury. A pipe 35 communicating with the tank 34 has a branch 37 which extends to the cell 19 and is controlled by a valve 36. A pipe 37A leading to the cell 19A branches from the pipe 35 and is controlled by a valve 38. When the machine is in operation, mercury will flow from the tank 34 to the cells 19 and 19A and the rate of flow will be regulated by valves 36 and 38.

Referring now to Figure 7, it will be seen that the cell 19A is provided with an opening 39A at one end and near the bottom. A pipe 40A is connected with this opening and has an upward bend 41A which determines the level of the mercury which must be a short distance below the lower edge of the anode 20A. Pipe 40A extends over onto the plate 7A where it terminates in a perforated section 42A. This section of pipe has its outer end plugged and is provided with a plurality of small holes 43A which are located on top and through which the mercury escapes onto the plate 7A, the pipe being located beneath the apron 15 and in close proximity to the surface of the plate so as substantially to avoid flouring of the mercury delivered therefrom, thereby preventing material loss in mercury and values with the tailings. From the cell 19 a similar pipe 40 extends. The corresponding parts of this pipe have the same reference numerals as those given above, but with the letter A omitted.

Referring now more particularly to Figure 5, it will be observed that the bottom of trough 11 is inclined from the ends of the middle point, which has been indicated by numeral 44. A hole extends through the bottom at point 44 and to this a valve 45 is connected. A pipe 46 extends from this valve to the clean-out 47 to whose lower end or bottom a stop cock 48 is secured. A pipe 49 has its lower end connected with the clean-out 47 and its upper end bent into a gooseneck 50 whose height determines the level 14 of the mercury. The end of the gooseneck terminates over the inclined trough 51.

The lower end of the trough 51 has an opening 52 from which a pipe 53 extends downwardly and terminates a short distance below the upper end of the tank 54. A conical canvas strainer 55 is secured to the upper end of the tank 54 in the manner shown in Figure 4. A drain cock 56 is connected to the bottom of the tank 54 and is employed when the tank is to be drained.

From the tank 54 a pipe 57 extends to the pan 58 which can be subjected to a spray of water from the pipe 59. From the pan 58 a pipe 60 extends to the mercury pump 61, which is driven from the motor 62. This pump discharges the mercury through pipes 63 and 64 into tank 34 from which it flows into the cells 19 and 19A.

Let us now assume that the parts are assembled in the manner shown and described and that the hopper 12 is filled with pulp, meaning pulverized ore mixed with water containing metallic gold and platinum; that tank 17 is filled with a sodium chloride brine and that tank 34 contains mercury. The generator 21 is connected with the anodes 20 and the mercury cathodes 23. The faucet 18 is opened and brine is allowed to flow. This brine fills the cell 19 and overflows onto the launder 25 from which it enters the cell 19A and from this flows to the reservoir 27. The pump 28 serves to return the brine to the tank 17. The stop cocks 36 and 38 are now opened so as to allow mercury to flow into the cells through pipes 37 and 37A. Since the salt solution from tank 17 is a conductor, an electric current will flow from the anodes 20 and 20A to the cathodes 23 and 23A and this will disassociate the sodium chloride, liberating the chlorine gas, and transferring the sodium to the cathode. The gas may be removed by suitable means (not shown). The sodium readily combines with the mercury and forms a sodium amalgam. The intensity of the electric current and the rate of flow of the mercury is adjusted so that when the mercury leaves the cells it will contain about three one-hundredths of one per cent of sodium. The sodium amalgam now passes through the pipes 40 and 40A and emerging through the holes 43, 43A, falls upon the respective plates 7, 7A, establishing upon each of the latter a bed or coating which gradually moves down over the surface of its plate. The sodium amalgam passing over the plate 7 delivers into the trough 11, while the amalgam flowing over the plate 7A delivers into the trough 11A. The wet pulp flowing from the chute or launder 3 impinges directly on the bed of alkali metal amalgam flowing over the plate 7 at a region where the amalgam is substantially free of overlying matter, thus promoting penetration of the surface film of the flowing amalgam bed and better envelopment and amalgamating contact of the solid particles of the pulp with the amalgam. Similarly the pulp which overflows from the trough 11 and passes over the edge or apron 15 of the latter falls directly on the bed of amalgam on the plate 7A at a region where the amalgam is relatively free of overlying matter. When the pulp delivered from the launder 3 or overflowing from the trough 11 impinges upon the sodium amalgam flowing over the plate 7 or the plate 7A, as the case may be, the water of the pulp combines with the sodium and forms sodium hydroxide which is a powerful cleansing medium that removes any oily film from the gold and platinum, whereby the metal itself becomes exposed so that it will have good contact with and be acted upon by the amalgam. The chemical change which occurs when the water of the pulp reacts upon the sodium amalgam also has the effect of greatly decreasing the surface tension of the flowing bed of amalgam and thereby contributes to the more effective envelopment and amalgamating contact of the metallic particles of the pulp. In its course through the apparatus the pulp flows from the hopper 2 through the chute 3 and is delivered upon the bed of amalgam flowing over the plate 7. At the lower end of this plate the pulp enters the trough 11 and passes underneath the baffle block 13 therein, thence delivering over the edge or apron 15 of the trough 11 and falling upon the surface of the amalgam bed which is flowing down over the plate 7A. At the lower end of this latter plate the pulp delivers into the trough 11A and after passing beneath the baffle block 13A therein flows into the chute 16. Upon passing beneath the baffle plates 13, 13A, the pulp is forced against the surface of the amalgam so that the latter comes in contact with the gold and platinum. The greater part of the values are recovered on the uppermost plate and by using several plates in series a thorough recovery can be obtained.

As the amalgam flows from the troughs 11 and 11A, it passes through the respective pipes 46 into the corresponding clean-out traps 47 where the values of gold and platinum settle to the bottom due to their great density. The mercury passes from the traps through pipes 49 respectively leading therefrom and flows into the trough 51 and down into the canvas strainer 55 where any large particles are separated. The mercury that passes through the canvas strainer enters the tank 54 where further separation takes place and from which the settlings may be removed through the cock 56. The lighter mercury or sodium amalgam flows through pipe 57 to the pan 58 where the action of the water spray removes any trace of sodium that may still be present and since mercury alone has no affinity for platinum, any platinum which may be present, when the amalgam enters pan 58 will immediately be released and will settle to the bottom. If any gold or platinum still remains after the mercury returns to tank 34, it will stay in the mercury stream until it settles to the bottom in some one of the several clean-out traps.

I want to call particular attention to the fact that there is a continuous supply of nascent sodium amalgam which is supplied to the separator, and which, when subjected to the action of the water in the pulp, results in the production of sodium hydroxide which dissolves any grease or fat that may be on the metal particles.

The sodium amalgam, as above explained, is more active than mercury and has the property of combining with platinum so that these values will be recovered. This, therefore, makes this apparatus and method very valuable in platinum mining as it has heretofore been very difficult to recover the platinum.

Having now described the invention what is claimed as new is:

1. In combination, a plurality of amalgamating plates in tandem, means for flowing pulp containing values over said plates in succession, a means for preparing alkali metal amalgam and means for conveying said amalgam directly from said preparing means independently to the head of each of said plates and distributing it thereover.

2. In combination, a plurality of amalgamating plates in tandem, means for flowing pulp containing values over said plates in succession, a means for preparing alkali metal amalgam, means for conveying said amalgam directly from said preparing means independently to the head of each of said plates and distributing it thereover, and a trap between each two plates for catching the mercury and metal amalgam and allowing the pulp stream to pass on.

3. In combination a plurality of inclined amalgamating plates in tandem, means for flowing pulp over said plates in succession, a conduit for sodium amalgam transversely arranged at the head of each plate and open to allow the amalgam to pass to the plate, means for protecting said conduit from the pulp stream as it is fed to the plate, means for preparing sodium amalgam and means for conveying said amalgam directly from said preparing means and independently to said conduit of each plate.

4. In combination, a plurality of inclined amalgamating plates positioned to cooperate so that the material to be treated may pass from the tail of one to the head of another, means for flowing pulp containing values over said plates in succession, a means for preparing alkali metal amalgam, and a means for conveying said amalgam directly from said preparing means independently to the head of each of said plates and distributing it thereover.

5. In combination, a plurality of amalgamating plate sections positioned to cooperate so that the material to be treated may pass from one to the other, means for flowing pulp containing values over said plate sections in succession, means for preparing alkali metal amalgam, and means for conveying said amalgam directly from said preparing means independently to each of said plate sections and distributing it thereover.

6. The process of flowing wet pulp over an extended mercury surface and feeding freshly prepared sodium amalgam independently to the surface in proximity to the point of delivering the pulp to said surface, and at a plurality of spaced intervals along the path of flow to maintain the mercury surface at maximum efficiency.

7. The process that consists in establishing a flowing bed of alkali metal amalgam upon a surface and causing wet pulp containing values to impinge upon the upper surface of and flow as a thin sheet with the amalgam bed and continuously renewing the strength of the flowing amalgam.

8. The process that consists in establishing a flowing bed of alkali metal amalgam upon a surface and causing wet pulp containing values to impinge upon the upper surface of and flow as a thin sheet with the amalgam bed and thereafter causing the pulp to come into contact with additional continuously flowing alkali metal amalgam.

9. The process that consists in establishing a flowing bed of alkali metal amalgam upon a surface and causing wet pulp containing values to impinge upon the upper surface of the amalgam bed at a region where the latter is substantially free of overlying matter and to flow with said bed.

10. The process that comprises establishing a flowing bed of alkali metal amalgam upon a surface and causing wet pulp containing values to be delivered in a thin sheet upon the upper surface of and to flow freely with the amalgam bed and continuously renewing the strength of the flowing amalgam.

JAMES E. HOPKINS.